US010247634B2

(12) United States Patent
Nakamura et al.

(10) Patent No.: US 10,247,634 B2
(45) Date of Patent: Apr. 2, 2019

(54) DISCONNECTION DETECTION CIRCUIT OF PRESSURE DETECTION DEVICE (71) Applicants: CITIZEN FINEDEVICE CO., LTD., Minamitsuru-gun, Yamanashi (JP); CITIZEN HOLDINGS CO.,LTD., Tokyo (JP)

(72) Inventors: Rikoku Nakamura, Yamanashi (JP); Masanori Yomoyama, Yamanashi (JP); Tetsuya Aiba, Yamanashi (JP); Yuta Kanamori, Yamanashi (JP)

(73) Assignees: CITIZEN FINEDEVICE CO., LTD., Minamitsuru-Gun, Yamanashi (JP); CITIZEN WATCH CO., LTD., Nishitokyo-Shi, Tokyo (JP)

( * ) Notice: Subject to any disclaimer, the term of this patent is extended or adjusted under 35 U.S.C. 154(b) by 164 days.

(21) Appl. No.: 15/129,713

(22) PCT Filed: Mar. 25, 2015

(86) PCT No.: PCT/JP2015/059138
§ 371 (c)(1),
(2) Date: Sep. 27, 2016

(87) PCT Pub. No.: WO2015/147062
PCT Pub. Date: Oct. 1, 2015

(65) Prior Publication Data
US 2017/0138810 A1 May 18, 2017

(30) Foreign Application Priority Data

Mar. 27, 2014 (JP) ................. 2014-067067

(51) Int. Cl.
*G01L 23/22* (2006.01)
*G01L 19/12* (2006.01)
*G01L 19/08* (2006.01)

(52) U.S. Cl.
CPC .......... *G01L 23/225* (2013.01); *G01L 19/083* (2013.01); *G01L 19/12* (2013.01)

(58) Field of Classification Search
CPC ..................................... G01L 23/225
(Continued)

(56) References Cited

U.S. PATENT DOCUMENTS

2001/0052337 A1 12/2001 Suzuki et al.
2004/0189480 A1* 9/2004 Imai ............................. 340/663
2006/0229798 A1* 10/2006 Fukuzawa ..................... 701/114

FOREIGN PATENT DOCUMENTS

JP 2-57075 A 4/1990
JP 5-235676 A 9/1993
(Continued)

OTHER PUBLICATIONS

Okagaki. Translation of JP05235676. Published Sep. 1993. Translated Apr. 2018.*
(Continued)

*Primary Examiner* — Walter L Lindsay, Jr.
*Assistant Examiner* — Philipmarcus T Fadul
(74) *Attorney, Agent, or Firm* — Birch, Stewart, Kolasch & Birch, LLP (57) ABSTRACT A disconnection detection circuit includes: a pull-up resistor to which the detection signal is fed and which connects a signal line connected to the wiring cable to a power supply or a pull-down resistor which connects the signal line to a GND; and a voltage clip circuit 105 which includes a high-voltage clip circuit which is connected between the signal line and the power supply and which clips the voltage of the signal line to the maximum specified voltage and a low-voltage clip circuit which is connected between the signal line and the GND and which clips the voltage of the signal line to the minimum specified voltage.

13 Claims, 5 Drawing Sheets (58) Field of Classification Search
USPC .......................................................... 73/35.12
See application file for complete search history.

(56) References Cited

FOREIGN PATENT DOCUMENTS

| | | |
|---|---|---|
| JP | 5-321747 A | 12/1993 |
| JP | 2002-62211 A | 2/2002 |

OTHER PUBLICATIONS

International Search Report issued in PCT/JP2015/059138, dated Jun. 30, 2015.

* cited by examiner

DISCONNECTION DETECTION CIRCUIT OF PRESSURE DETECTION DEVICE

TECHNICAL FIELD

The present invention relates to a disconnection detection circuit of a pressure detection device which is suitably used when pressure such as the combustion pressure of an engine is detected.

BACKGROUND ART

Figure 6:
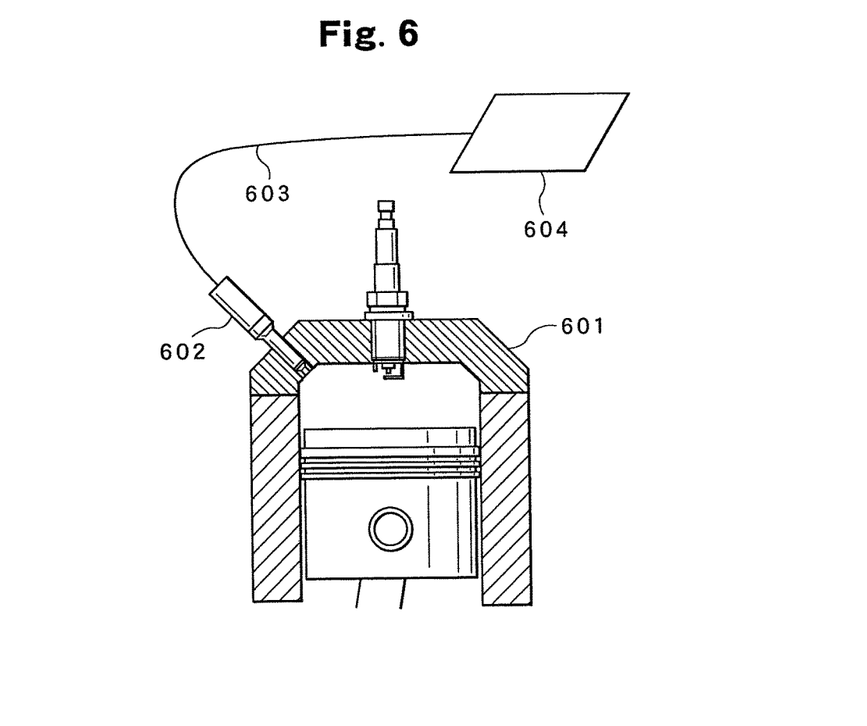
FIG. 6 is a schematic view illustrating the background technology of an engine to which a pressure detection device is fitted

In general, a pressure detection device is known which is fitted to an engine mounted in an automobile and which uses a piezoelectric element (sensor element) incorporated to detect pressure (combustion pressure) within a combustion chamber, and the pressure detection device generally has a structure as shown in FIG. 6 and is fitted to the engine. In FIG. 6, symbol 601 represents an automobile engine, symbol 602 represents a pressure detection portion, symbol 603 represents a wiring cable and symbol 604 represents a control board. In this case, the pressure detection portion 602 is connected to the control board 604 through the wiring cable 603 which includes a power supply line, a GND line and a signal line for transmitting a detection signal. The control board 604 has the function of performing restraint on the engine 601 based on the detection signal from the pressure detection portion 602. On the other hand, the pressure detection portion 602 generally uses a piezoelectric crystal as a sensor element for detecting pressure, and feeds a charge signal corresponding to the amount of variation in the pressure obtained from the piezoelectric crystal to a signal processing circuit, and the charge signal is integrated by an integral circuit and is thereby converted into a voltage (detection signal) similar to the pressure.

Figure 7:
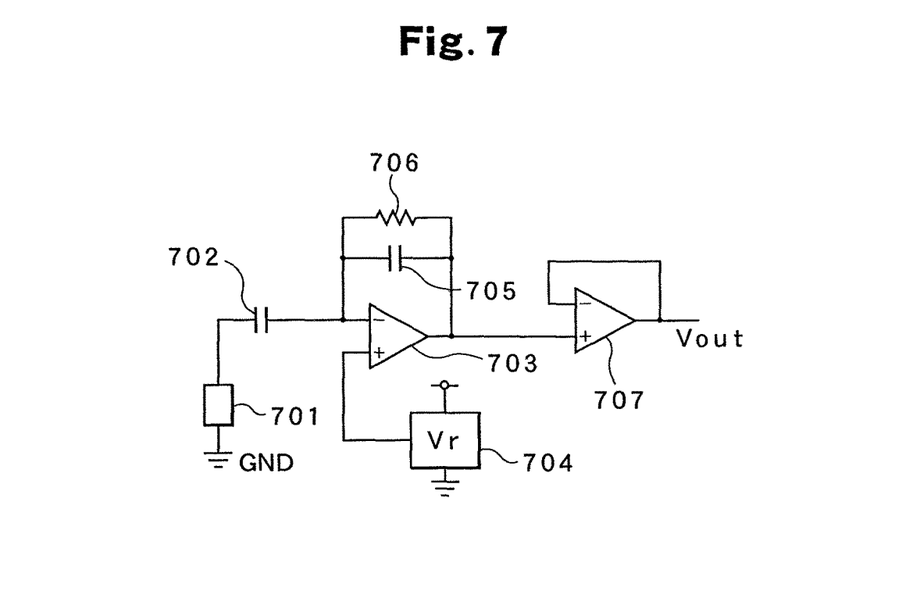
FIG. 7 is a circuit diagram of a pressure detection device included in the disconnection detection circuit.
Figure 8:
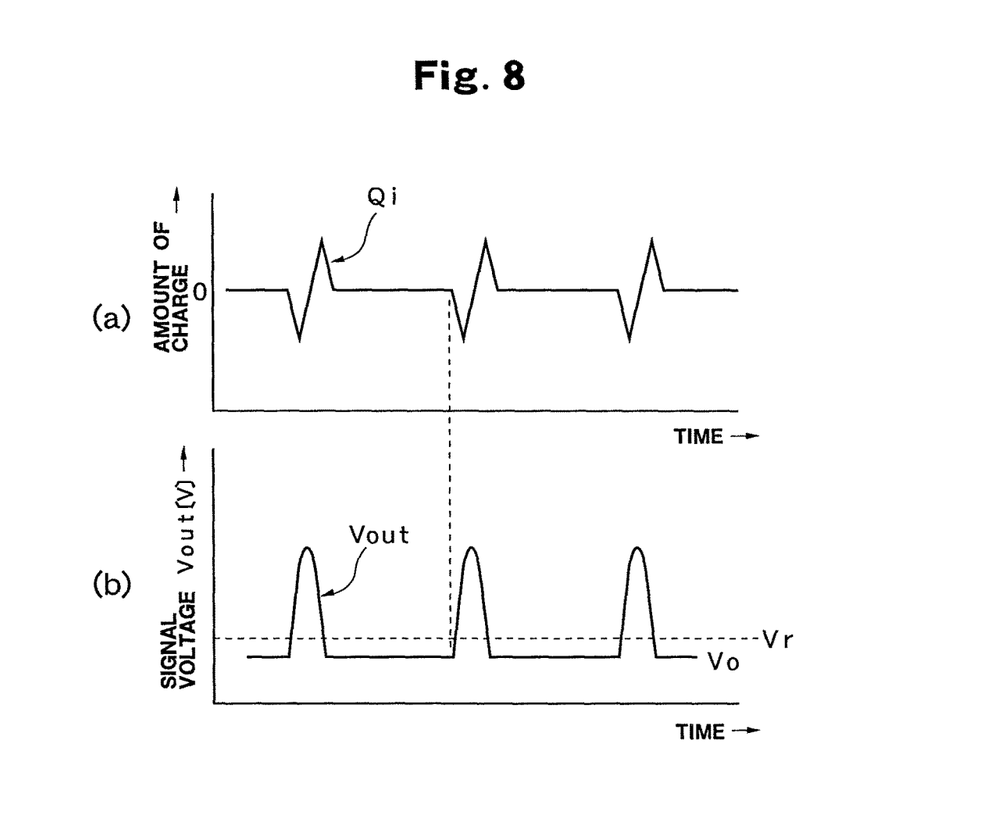
FIG. 8 is a signal waveform diagram illustrating the operation of the disconnection detection circuit.

Conventionally, as this type of signal processing circuit, a signal processing device of a piezoelectric sensor disclosed in patent literature 1 is known. FIG. 7 shows an outline of the signal processing device disclosed in patent literature 1. In FIG. 7, one terminal of a sensor element 701 is connected through a capacitor 702 to the inverting input terminal of an operational amplifier 703, and the other terminal of the sensor element 701 is connected to the GND (ground) of the circuit. The non-inverting input terminal of the operational amplifier 703 is connected to a reference power supply 704, a reference voltage Vr is fed, and the inverting input terminal and the output terminal of the operational amplifier 703 are connected with a parallel circuit of a charge capacitor 705 and a discharge resistor 706 of a high resistance value. Furthermore, a signal output from the operational amplifier 703 is output through an operational amplifier 707 as a signal voltage Vout to the outside. FIG. 8(a) illustrates the waveform of the amount of charge (charge signal) Qi obtained from the sensor element 701, and FIG. 8(b) shows an example of the signal voltage Vout obtained from the operational amplifier 707. The voltage waveform shown in FIG. 8(b) is a waveform which is obtained by integrating the amount of charge Qi shown in FIG. 8(a). Although the base voltage $V_O$ (signal voltage when the amount of charge Qi is 0) of the signal voltage Vout is biased by the reference power supply 704, it does not match the reference voltage Vr and is lower than the reference voltage Vr due to a so-called waveform sinking phenomenon caused by the charge capacitor 705.

Incidentally, in terms of ensuring a satisfactory size and reliability, it is difficult for the control board 604 described previously to be incorporated in the pressure detection portion 602, and in general, the control board 604 is arranged in another place within an engine room and is connected with a wiring cable 603. Hence, the wiring cable 603 is drawn within the engine room, and since the engine room is often exposed to harsh environments due to temperature, humidity, wind pressure and the like, and external stress may be applied thereto, when the engine room is exposed to such environments for a long period of time, the wiring cable 603 may disconnect.

Figure 9:
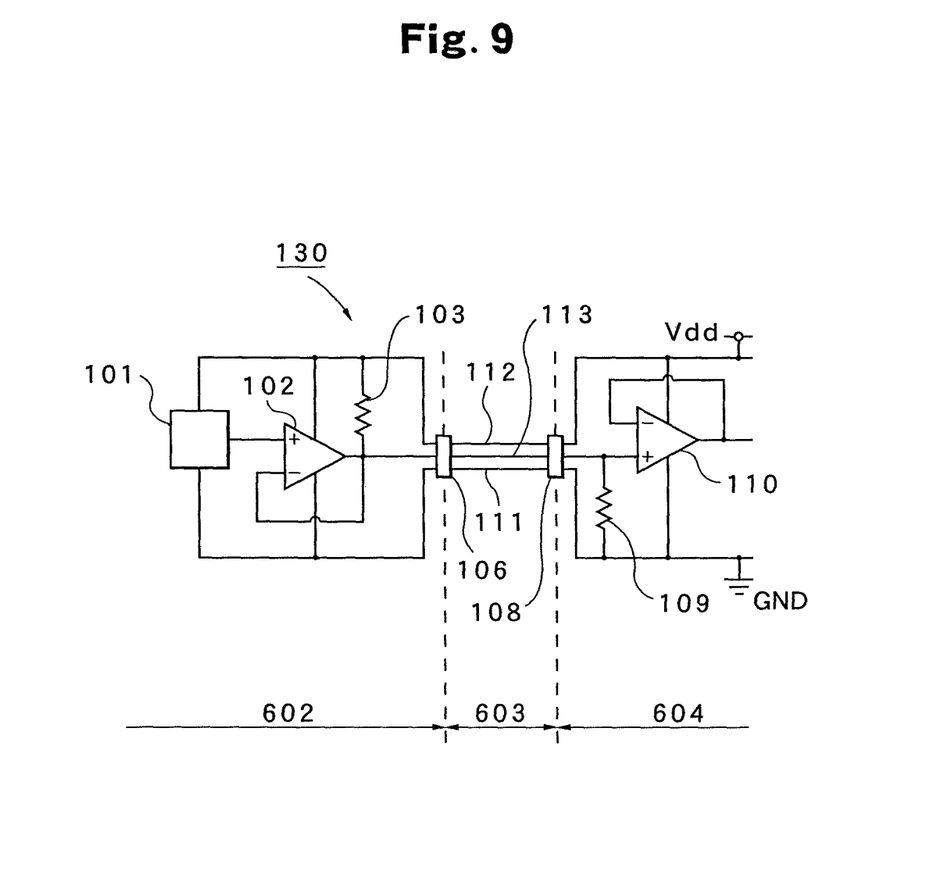
FIG. 9 is a circuit diagram of the entire pressure detection device.

Hence, in terms of ensuring the safety and reliability of an automobile, a means to detect disconnections which reliably and rapidly detects this type of disconnection is needed, and in general, a disconnection detection circuit 130 as shown in FIG. 9 is provided. In FIG. 9, symbol 602 represents the pressure detection portion shown in FIG. 6, symbol 604 represents the control board shown in FIG. 6 and symbol 603 represents the wiring cable shown in FIG. 6. Symbol 101 represents the part of a signal processing device (signal processing circuit) which includes the sensor element shown in FIG. 7. Symbol 102 represents an output amplifier included in the pressure detection portion 602, and symbol 110 represents an input amplifier included in the control board 604. As the elements of an abnormal detection circuit 130, a pull-up resistor 103 which pulls up the output of the output amplifier 102 is included, and a pull-down resistor 109 which pulls down the input of the input amplifier 110 is also included. Symbols 106 and 108 represent wiring cable sockets.

If either the power supply line 112, the GND line 111 or the signal line 113 included in the wiring cable 603 disconnects, it can be detected with the abnormal detection circuit 130. Specifically, when the signal line 113 disconnects, the input of the control board 604 is fixed by the pull-down resistor 109 to the voltage level of the GND. If the power supply line 112 disconnects, since no power is supplied to the side of the pressure detection portion 602, the output of the output amplifier 102 is the voltage level of the GND or has a high impedance, and the input of the control board 604 is fixed by the pull-down resistor 109 to the voltage level of the GND. Furthermore, if the GND line 111 disconnects, the output of the output amplifier 102 is the power supply voltage level or has a high impedance, and when the output of the output amplifier 102 is the power supply voltage level, the input of the control board 604 is fixed to the power supply voltage level whereas when the output of the output amplifier 102 has a high impedance, the input of the control board 604 is fixed by the pull-up resistor 103 and the pull-down resistor 109 to a voltage obtained by dividing the power supply voltage Vdd. Here, when the resistance value of the pull-up resistor 103 is set significantly lower than the resistance value of the pull-down resistor 109, the output voltage serving as a detection signal is a fixed voltage in the vicinity of the power supply voltage Vdd. As described above, if either the power supply line 112, the GND line 111 or the signal line 113 in the wiring cable 603 disconnects, the input signal of the control board 604 is fixed to the voltage level of the GND or the power supply voltage level (including the level in the vicinity thereof), with the result that based on this, the side of the control board 604 can detect the disconnection. The same function can be achieved even when the output on the side of the pressure detection portion 602 is pulled down and the input on the side of the control board 604 is pulled up.

CITATION LIST

Patent Literature

JP-No. 2002-62211

SUMMARY OF INVENTION

Technical Problem

However, in the conventional disconnection detection device (disconnection detection circuit) of the pressure detection device described above, the following problems are present.

Specifically, since the disconnection of the wiring cable 603 is determined by the control board 604 based on the fact that the input signal of the control board 604 is fixed to the voltage level of the GND or the power supply voltage level, an erroneous determination (erroneous detection) may be performed. In other words, since the signal voltage related to pressure detection may vary in magnitude depending on conditions, and the signal voltage may instantaneously reach the voltage level of the GND or the voltage of the power supply voltage level, whether or not the disconnection occurs is determined only by the voltage level, and thus an erroneous determination (erroneous detection) is more likely to be performed, with the result that reliability is disadvantageously degraded.

On the other hand, this problem can be avoided by performing a determination in which the voltage level and the elapsed time thereof are combined. In other words, a condition in which the voltage level of the GND or the power supply voltage level continues for a set time or more is included in the determination conditions, and thus it is possible to avoid an erroneous determination (erroneous detection). However, in this method, a processing circuit is complicated, and thus an increase in cost is not negligible, and since it is necessary to wait for the set time, it is impossible to perform a rapid determination. Although the set time is reduced, and thus it is possible to ensure a certain degree of swiftness, the effectiveness thereof is lowered in terms of preventing an erroneous determination (erroneous detection).

Hence, for the detection of the disconnection of the wiring cable 603, the conventional disconnection detection circuit is insufficient in terms of ensuring both reliability and swiftness, with the result that further improvements are needed.

The present invention has the objective of providing a disconnection detection circuit of a pressure detection device which solves the problems present in the background technology described above.

Solution to Problem

In order to solve the foregoing problems, according to the present invention, there is provided a disconnection detection circuit 1 of a pressure detection device, with the pressure detection device including at least: a pressure detection portion 11 which has a pressure detection element 101 which receives pressure so as to output a charge signal corresponding to the pressure; and a wiring cable 12 which transmits a detection signal Dd output from the pressure detection portion 11 to an external circuit (13), the disconnection detection circuit 1 detecting a disconnection of the wiring cable 12 in the pressure detection device 10, where the disconnection detection circuit 1 includes: a pull-up resistor 103 to which the detection signal Dd is fed and which connects a signal line 113c connected to the wiring cable 12 to a power supply (power supply voltage) Vdd or a pull-down resistor which connects the signal line 113c to a GND; and a voltage clip circuit 105 (105a . . . ) which includes a high-voltage clip circuit 105au . . . which is connected between the signal line 113c and the power supply Vdd and which clips a voltage of the signal line 113c to the maximum specified voltage Vdm and a low-voltage clip circuit 105ad . . . which is connected between the signal line 113c and the GND and which clips the voltage of the signal line 113c to the minimum specified voltage.

In this case, in a preferred aspect of the invention, the high-voltage clip circuit 105au . . . can include a high voltage-side resistor voltage dividing circuit 30u . . . which sets the maximum specified voltage Vdm and is connected between the power supply Vdd and the GND; in this case, the high-voltage clip circuit 105bu . . . can use a transistor pair of a pnp transistor 402 . . . and an npn transistor 401 . . . to which divided voltage obtained from the high voltage-side resistor voltage dividing circuit 40u . . . is fed; and in particular, the transistor pair is preferably formed with complimentary transistors. The high-voltage clip circuit 105au can use a diode 301 to which divided voltage obtained from the high voltage-side resistor voltage dividing circuit 30u is fed. On the other hand, the low-voltage clip circuit 105ad . . . can include a low voltage-side resistor voltage dividing circuit 40d . . . which sets the minimum specified voltage Vds and which is connected between the power supply Vdd and the GND; in this case, the low-voltage clip circuit 105bd . . . can use a transistor pair of a pnp transistor 405 . . . and an npn transistor 404 . . . to which divided voltage obtained from the low voltage-side resistor voltage dividing circuit 40d . . . is input; and in particular, the transistor pair is preferably formed with complimentary transistors. The low-voltage clip circuit 105ad can use a diode 302 to which divided voltage obtained from the low voltage-side resistor voltage dividing circuit 30d is fed. On the other hand, the voltage clip circuit 105 preferably includes an output resistor 104 which is connected in series to the signal line 113c on the input side of the high-voltage clip circuit 105au . . . and the low-voltage clip circuit 105ad . . . . The external circuit can be applied to a control board 13 which outputs a control signal based on the detection signal Dd, and the wiring cable 12 can include a signal line 113 connected to the signal line 113c, a power supply line 112 connected to the power supply Vdd and a GND line 111 connected to the GND.

Advantageous Effects of Invention

In the disconnection detection circuit 1 of the pressure detection device described above and according to the present invention, the following remarkable effects are provided.

(1) Since the voltage clip circuit 105 (105a . . . ) including the high-voltage clip circuit 105au . . . and the low-voltage clip circuit 105ad . . . is included, when the detection signal Dd is equal to or less than the minimum specified voltage Vds, the voltage level of the signal line 113c can be clipped to the minimum specified voltage Vds by the voltage from the power supply Vdd whereas when the detection signal Dd exceeds the maximum specified voltage Vdm, the voltage level of the signal line 113c is lowered to the GND voltage, and thus the voltage level can be clipped to the maximum specified voltage Vdm. Consequently, it is possible to reliably and rapidly detect disconnections related to the wiring cable 12, the peripheral connection portions thereof and the like, and it is possible to provide a highly reliable pressure detection device 10 while reducing its cost and size with a relatively simple configuration. Hence, in particular, it is optimal to use the disconnection detection circuit 1 for the pressure detection device 10 which detects the combustion pressure of an engine 601 mounted in an automobile.

(2) In a preferred aspect, the high-voltage clip circuit 105au . . . includes the high voltage-side resistor voltage dividing circuit 30u . . . which sets the maximum specified voltage Vdm and which is connected between the power supply Vdd and the GND, and thus it is possible to easily set the maximum specified voltage Vdm with a simple and low-cost circuit.

(3) In a preferred aspect, the high-voltage clip circuit 105bu . . . uses the transistor pair of the pnp transistor 402 . . . and the npn transistor 401 . . . to which the divided voltage obtained from the high voltage-side resistor voltage dividing circuit 40u . . . is fed, and thus it is possible to cancel out variations in the base-emitter voltage caused by temperature. Hence, it is possible to avoid the influences of temperature on the maximum specified voltage Vdm, and since the clip current is not directly passed to the high voltage-side resistor voltage dividing circuit 40u . . . , it is possible to avoid variations in the clip voltage caused by the clip current.

(4) In a preferred aspect, the transistor pair is formed with complimentary transistors whose properties are equal to each other, and thus it is possible to easily form a desirable transistor pair.

(5) In a preferred aspect, the high-voltage clip circuit 105au uses the diode 301 to which the divided voltage obtained from the high voltage-side resistor voltage dividing circuit 30u is fed, and thus it is possible to easily form the high-voltage clip circuit 105au with a small number of components.

(6) In a preferred aspect, the low-voltage clip circuit 105ad . . . includes the low voltage-side resistor voltage dividing circuit 30d . . . which sets the minimum specified voltage Vds and is connected between the power supply Vdd and the GND, and thus it is possible to easily set the minimum specified voltage Vds with a simple and low-cost circuit.

(7) In a preferred aspect, the low-voltage clip circuit 105bd . . . uses the transistor pair of the pnp transistor 405 . . . and the npn transistor 404 . . . to which the divided voltage obtained from the low voltage-side resistor voltage dividing circuit 40d . . . is fed. Hence, it is possible to avoid the influences of temperature on the minimum specified voltage Vds, and since the clip current is not directly passed to the low voltage-side resistor voltage dividing circuit 40d . . . , it is possible to avoid variations in the clip voltage caused by the clip current.

(8) In a preferred aspect, the low-voltage clip circuit 105ad uses the diode 302 to which the divided voltage obtained from the low voltage-side resistor voltage dividing circuit 30d is fed, and thus it is possible to easily form the low-voltage clip circuit 105ad with a small number of components.

(9) In a preferred aspect, the voltage clip circuit 105 includes the output resistor 104 which is connected in series to the signal line 113c on the input side of the high-voltage clip circuit 105au . . . and the low-voltage clip circuit 105ad . . . , and thus it is possible to easily reduce (adjust) the amount of current necessary when the voltage clip circuit 105 adjusts the output voltage.

(10) In a preferred aspect, the external circuit is applied to the control board 13 which outputs the control signal based on the detection signal Dd, and in particular, it is optimal to use the disconnection detection circuit 1 for the control system of an engine mounted in an automobile.

(11) In a preferred aspect, the wiring cable 12 includes the signal line 113 connected to the signal line 113c, the power supply line 112 connected to the power supply Vdd and the GND line 111 connected to the GND, and thus it is possible to reliably and rapidly detect disconnections on the lines 111 to 113.

REFERENCE SIGNS LIST

1: disconnection detection circuit, 10: pressure detection device, 11: pressure detection portion, 12: wiring cable, 13: control board (external circuit), 30u . . . : high voltage-side resistor voltage dividing circuit, 30d . . . : low voltage-side resistor voltage dividing circuit, 101: pressure detection element, 103: pull-up resistor, 104: output resistor, 105: voltage clip circuit, 105au . . . : high-voltage clip circuit, 105ad . . . : low-voltage clip circuit, 111: GND line, 112: power supply line, 113: signal line, 113c: signal line, 301: diode, 302: diode, 401 . . . : npn transistor, 402 . . . : pnp transistor, Dd: detection signal, Vdd: power supply (power supply voltage), Vdm: maximum specified voltage, Vds: minimum specified voltage

DESCRIPTION OF EMBODIMENTS

A preferred embodiment according to the present invention will then be described in detail with reference to drawings.

Figure 1:
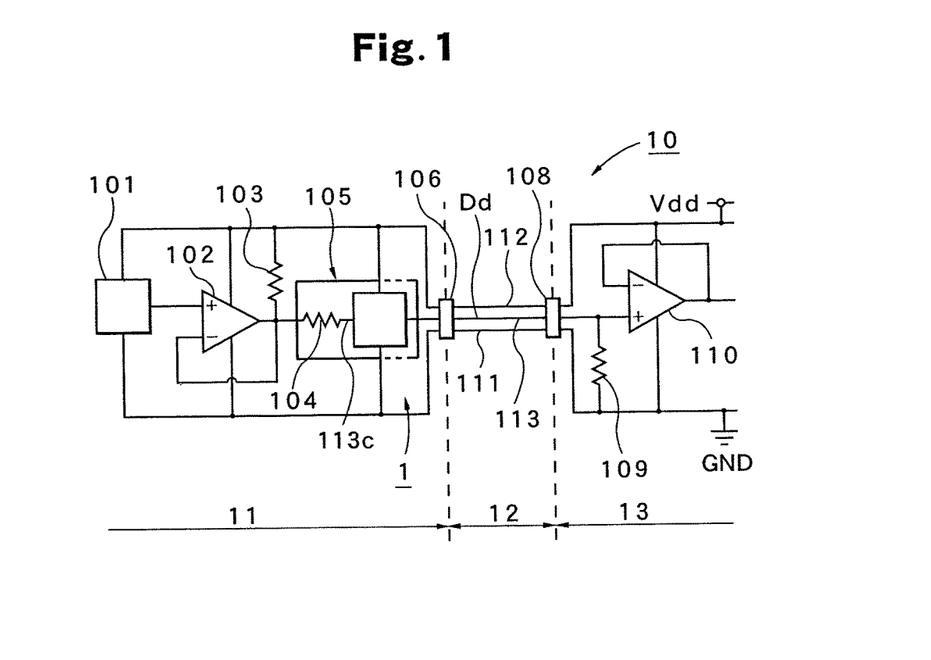
FIG. 1 is a basic configuration diagram of a pressure detection device which includes a disconnection detection circuit according to a preferred embodiment of the present invention.

The overall configuration of a pressure detection device 10 which includes a disconnection detection circuit 1 according to the present embodiment will first be described with reference to FIG. 1.

When the pressure detection device 10 is roughly classified, the pressure detection device 10 includes a pressure detection portion 11, a control board 13 and a wiring cable 12 which connects the pressure detection portion 11 and the control board 13. The pressure detection portion 11 includes a pressure detection portion 101 and an output amplifier 102, and also includes a pull-up resistor 103 and a voltage clip circuit 105 which form the disconnection detection circuit 1. The wiring cable 12 includes a power supply line 112, a GND line 111 and a signal line 113 which transmits an output signal. Symbols 106 and 108 represent wiring cable sockets. Furthermore, the control board 13 includes an input amplifier 110 and a pull-down resistor 109.

In this case, the pressure detection portion 101 is connected to the input side of the output amplifier 102. The output side of the output amplifier 102 is connected to the input side of the voltage clip circuit 105 and is connected through the pull-up resistor 103 to a power supply Vdd. Although a case where the pull-up resistor 103 is connected to the stage preceding the voltage clip circuit 105 is illustrated, the pull-up resistor 103 may be connected to the stage succeeding the voltage clip circuit 105, that is, the stage preceding the wiring cable socket 106. The output side of the voltage clip circuit 105 is connected through the signal line 113 in the wiring cable 12 to the side of the control board 13, and the power supply line and the GND line on the side of the pressure detection portion 11 are connected through the power supply line 112 and the GND line 111 in the wiring cable 12 to the side of the control board 13. As described above, the signal line 113 connected to a signal line 113c, the power supply line 112 connected to the power supply Vdd and the GND line 111 connected to the GND are included in the wiring cable 12, and thus it is possible to reliably and rapidly detect the disconnection of the lines 113, 112 and 111. Although the control board 13 is an external circuit, as an external circuit, by applying such a control board 13, it is possible to output a control signal based on the detection signal Dd, with the result that in particular, it is possible to establish the optimum disconnection detection circuit 1 in the control system of an engine mounted in an automobile.

Although described in detail later, the voltage clip circuit 105 has the function of clipping the voltage level to the minimum specified voltage Vds by using the voltage from the power supply Vdd when the detection signal Dd which is input is equal to or less than the minimum specified voltage Vds, as well as clipping the voltage level to the maximum specified voltage Vdm by lowering the voltage to the GND voltage when the detection signal Dd which is input is equal to or more than the maximum specified voltage Vdm. The voltage clip circuit 105 includes an output resistor 104 which is directly connected to the signal line 113c. The output resistor 104 has the function of reducing the amount of current necessary when the voltage clip circuit 105 adjusts the output voltage.

The specific configuration of the disconnection detection circuit 1 according to the present embodiment will then be described with reference to FIGS. 1 and 2.

Figure 2:
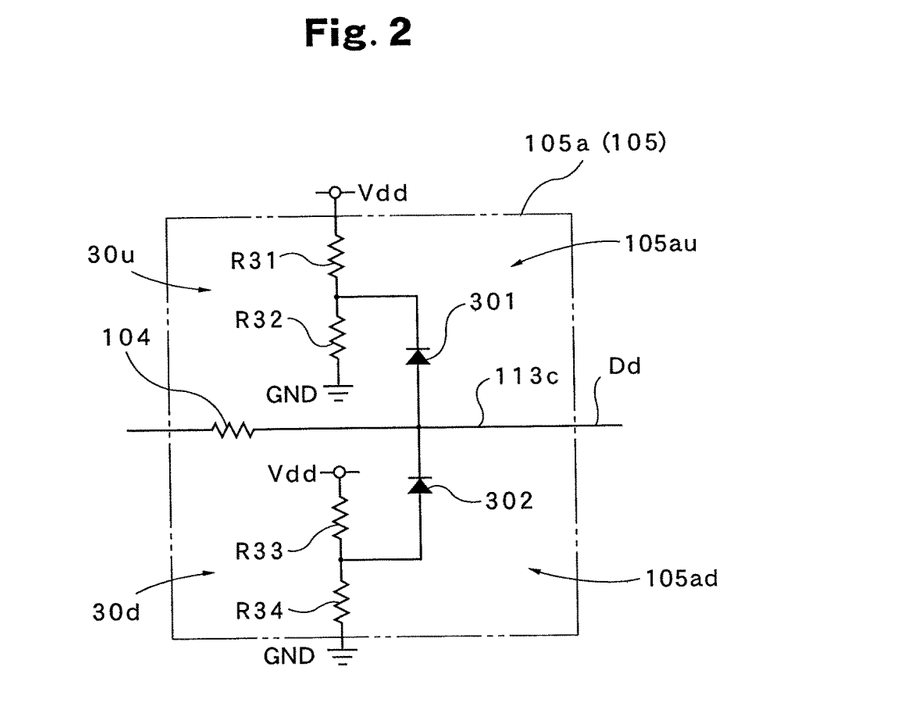
FIG. 2 is a circuit diagram of a voltage clip circuit included in the disconnection detection circuit.

The disconnection detection circuit 1 includes a voltage clip circuit 105a (105) shown in FIG. 2, and in particular, an example of the simplest configuration using a diode is shown. Symbol 113c represents a signal line in which the output side is connected to the signal line 113 described previously and in which the input side is connected through the output resistor 104 described previously to the output side of the output amplifier 102.

The voltage clip circuit 105a includes a high-voltage clip circuit 105au and a low-voltage clip circuit 105ad. The high-voltage clip circuit 105au includes a high voltage-side resistor voltage dividing circuit 30u which is formed with a series circuit of a resistor R31 and a resistor R32 connected between the power supply (power supply voltage) Vdd and the GND. The high voltage-side resistor voltage dividing circuit 30u described above is provided, and thus it is possible to easily set the maximum specified voltage Vdm with a simple low-cost circuit. The connection point of the resistor R31 and the resistor R32 and the signal line 113c are connected with a diode 301. The anode side of the diode 301 is connected to the signal line 113c. In this way, a voltage value obtained by adding the dropped voltage in the forward direction of the diode 301 to the divided voltage of the resistor R31 and the resistor R32 is set to the maximum specified voltage Vdm, and when the magnitude of the detection signal Dd fed to the signal line 113c exceeds the maximum specified voltage Vdm, the voltage of the signal line 113c is clipped to the maximum specified voltage Vdm. As described above, in the high-voltage clip circuit 105au, if the diode 301 to which the divided voltage obtained from the high voltage-side resistor voltage dividing circuit 30u is fed is used, it is possible to easily establish a high-voltage clip circuit 105au with a small number of components.

On the other hand, the low-voltage clip circuit 105ad includes a low voltage-side resistor voltage dividing circuit 30d formed with a series circuit of resistors R33 and R34 connected between the power supply Vdd and the GND. The low voltage-side resistor voltage dividing circuit 30d described above is provided, and thus it is possible to easily set the minimum specified voltage Vds with a simple low-cost circuit. The connection point of the resistor R33 and the resistor R34 and the signal line 113c are connected with a diode 302. The anode side of the diode 302 is connected to the signal line 113c. In this way, the voltage value obtained by subtracting the dropped voltage in the forward direction of the diode 302 from the divided voltage of the resistor R33 and the resistor R34 is set to the minimum specified voltage Vds, and when the magnitude of the detection signal Dd fed to the signal line 113c is equal to or less than the minimum specified voltage Vds, the voltage of the signal line 113c is clipped to the minimum specified voltage Vds. As described above, in the low-voltage clip circuit 105ad, if the diode 302 to which the divided voltage obtained from the low voltage-side resistor voltage dividing circuit 30d is fed is used, it is possible to easily establish the low-voltage clip circuit 105ad with a small number of components.

Hence, the output resistor 104 directly connected to the signal line 113c is connected to the input side of the high-voltage clip circuit 105au and the low-voltage clip circuit 105ad. The output resistor 104 described above is provided, and thus it is possible to easily reduce (adjust) the amount of current necessary when the voltage clip circuit 105 adjusts the output voltage. Since the resistance value of the output resistor 104 is the output impedance of the pressure detection portion 11, it is not appropriate to excessively increase it, and the resistance value is preferably set with consideration given to the requirement on the side of the control board 13 and the tolerance for the amount of current.

The operation of the disconnection detection circuit 1 according to the present embodiment will then be described with reference to FIGS. 1 to 3. Since the overall operation of the pressure detection device 10 is the same as the operation shown in FIGS. 6 to 9 described previously, the detailed description of the operation will be omitted.

Figure 3:
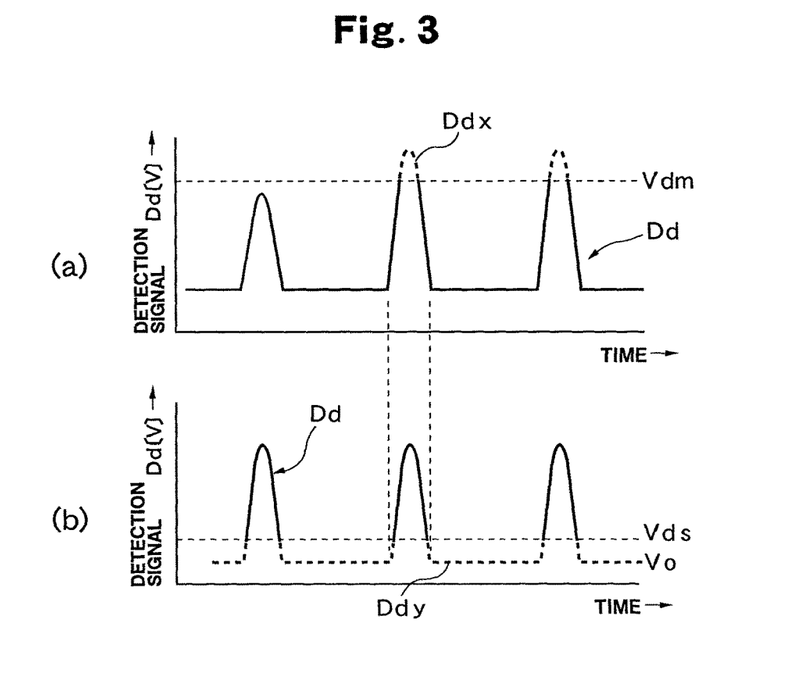
FIG. 3 is a signal waveform diagram for illustrating the operation of the disconnection detection circuit.

FIG. 3(a) shows a waveform when the detection signal Dd output from the output amplifier 102 exceeds the maximum specified voltage Vdm, and FIG. 3(b) shows a waveform when the detection signal Dd is equal to or less than the minimum specified voltage Vds due to the sinking phenomenon of the waveform. The horizontal axis represents time, and the vertical axis represents the detection signal Dd [V].

As shown in FIG. 3(a), the signal portion Ddx exceeding the maximum specified voltage Vdm is clipped to the maximum specified voltage Vdm, and the detection signal Dd output from the pressure detection portion 11 is the signal portion which is indicated by solid lines. As shown in FIG. 3(b), the signal portion Ddy equal to or less than the minimum specified voltage Vds is clipped to the minimum specified voltage Vds, and the detection signal Dd output from the pressure detection portion 11 is the signal portion which is indicated by solid lines.

As described above, the voltage waveform of the detection signal Dd output from the pressure detection device 10 according to the present embodiment is constantly controlled to fall between the minimum specified voltage Vds and the maximum specified voltage Vdm. In other words, the detection signal Dd output from the output amplifier 102 is pulled up to the power supply line 112 by the pull-up resistor 103, and the signal input to the control board 13 is pulled down to the GND line 111 by the pull-down resistor 109. In this way, if any one of the power supply line 112, the GND line 111 or the signal line 113 disconnects, the detection signal Dd is fixed to the voltage level of the GND or the voltage of the power supply voltage level.

In a case where its normal operation is performed, the detection signal Dd output from the pressure detection device 10 according to the present embodiment is constantly present between the minimum specified voltage Vds and the maximum specified voltage Vdm due to the voltage clip circuit 105a, and thus when the voltage level of each line in the wiring cable 12 is equal to or less than the minimum specified voltage Vds or exceeds the maximum specified voltage Vdm, it is possible to immediately detect that a disconnection occurs solely through the determination of the voltage level. With respect to pulling up and pulling down, even when the side of the pressure detection portion 11 is pulled down and the side of the control board 13 is pulled up, the same effects can be obtained.

Incidentally, as described previously, since a reference voltage Vr is output as a base voltage $V_O$ on the low voltage side of the detection signal Dd, though it is thought that the low-voltage clip circuit 105ad is not necessary, when the detection signal Dd is large, the detection signal Dd may be equal to or less than the minimum specified voltage Vds because the sinking phenomenon of the waveform is intensified. Moreover, when heat is rapidly applied to the sensor element, a negative charge signal is output from the sensor element due to a distortion in the enclosure holding the sensor element, with the result that the charge signal instantaneously may reach the vicinity of the voltage level of the GND. In this case, when the low-voltage clip circuit 105ad is not provided, even if the wiring cable 12 disconnects, the side of the control board 13 may perform an erroneous determination. Hence, it is important to provide the voltage clip circuit 105a both on the high-voltage side and on the low-voltage side.

A variation of the voltage clip circuit 105 forming the disconnection detection circuit 1 according to the present embodiment will then be described with reference to FIGS. 4 and 5.

Although the voltage clip circuit 105a described previously and shown in FIG. 3 can advantageously and easily perform the operation with a small number of components, when the dropped voltage in the forward direction of the diodes 301 and 302 is varied due to a variation in temperature, or when a large clip current is passed due to a rapid change in the voltage, the clip voltage is disadvantageously changed.

Figure 4:
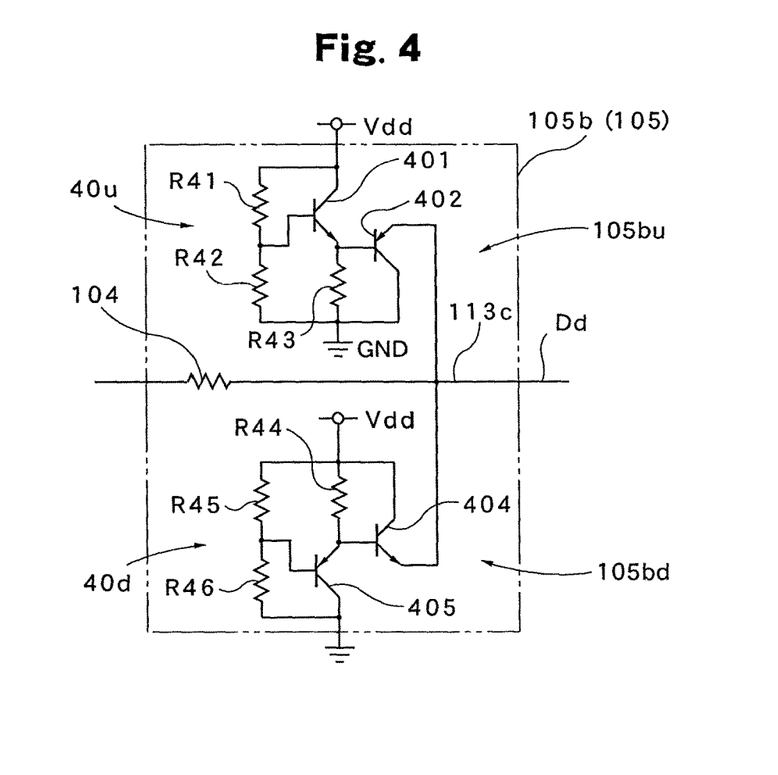
FIG. 4 is a circuit diagram of a voltage clip circuit according to a variation included in the disconnection detection circuit.

FIG. 4 shows an example of the configuration of a clip circuit 105b which uses transistors that remove the disadvantage of the voltage clip circuit 105a described above and shown in FIG. 3. The voltage clip circuit 105b includes a high-voltage clip circuit 105bu and a low-voltage clip circuit 105bd. The high-voltage clip circuit 105bu includes: a high voltage-side resistor voltage dividing circuit 40u which is formed with a series circuit of resistors R41 and R42 connected between a power supply Vd and the GND; and a transistor circuit which is connected between the connection point of the resistors R41 and R42 and a signal line 303 and which is formed with an npn transistor 401, a pnp transistor 402 and a resistor R43. In this case, the gate of the transistor 401 is connected to the connection point of the resistors R41 and R42, the collector thereof is connected to the power supply Vd and the emitter thereof is connected through the resistor R43 to the GND, and the gate of the transistor 402 is connected to the emitter of the transistor 401, the collector thereof is connected to the GND and the emitter thereof is connected to a signal line 403. In this way, the voltage obtained by adding the base-emitter voltage of the transistor 402 to the voltage obtained by subtracting the base-emitter voltage of the transistor 401 from the divided voltage of the resistors R41 and R42 is the maximum specified voltage Vdm. If complimentary transistors whose properties are equal to each other are used as the transistors 401 and 402, the maximum specified voltage Vdm will be essentially equal to the divided voltage of the resistors R41 and R42.

On the other hand, the low-voltage clip circuit 105bd includes: a low voltage-side resistor voltage dividing circuit 40d which is formed with the series circuit of resistors R45 and R46 connected between the power supply Vd and the GND; and a transistor circuit which is connected between the connection point of the resistors R45 and R46 and the signal line 303 and which is formed with an npn transistor 404, a pnp transistor 405 and a resistor R44. In this case, the gate of the transistor 405 is connected to the connection point of the resistors R45 and R46, the collector thereof is connected to the GND and the emitter thereof is connected through the resistor R44 to the power supply Vd, and the gate of the transistor 404 is connected to the emitter of the transistor 405, the collector thereof is connected to the power supply Vd and the emitter thereof is connected to the signal line 403. If complimentary transistors whose properties are equal to each other are used as the transistors 404 and 405, the minimum specified voltage Vds will be essentially equal to the divided voltage of the resistors R45 and R46.

In the case of the voltage clip circuit 105b shown in FIG. 4, even if the base-emitter voltage of the transistor is varied by temperature, since the npn transistor and the pnp transistor are used as a pair, it is possible to cancel out variations in the base-emitter voltage caused by temperature. Hence, it is possible to avoid the influences of temperature on the maximum specified voltage Vdm and the minimum specified voltage Vds, and since the clip current is not directly passed to the high voltage-side resistor voltage dividing circuit 40u and the low voltage-side resistor voltage dividing circuit 40d, it is possible to avoid variations in the clip voltage caused by the clip current.

Figure 5:
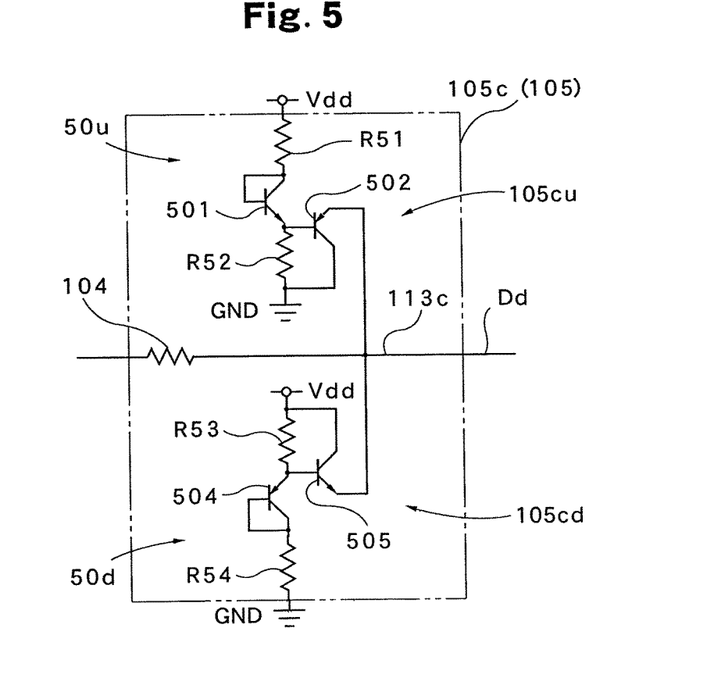
FIG. 5 is a circuit diagram of a voltage clip circuit according to another variation included in the disconnection detection circuit.

FIG. 5 shows, as with FIG. 4, an example of the configuration of a clip circuit 105c which uses transistors that remove the disadvantage of the voltage clip circuit 105a shown in FIG. 3, and also shows an example of a configuration with a smaller number of components than FIG. 4.

Symbol 503 represents a signal line in which the output side is connected to the signal line 113 described previously and in which the input side is connected to the output resistor 104 described previously. The voltage clip circuit 105c includes a high-voltage clip circuit 105cu and a low-voltage clip circuit 105cd. The high-voltage clip circuit 105cu includes a transistor circuit formed with an npn transistor 501, a pnp transistor 502 and resistors R51 and R52. In this case, the gate and the collector of the transistor 501 are connected through the resistor R51 to the power supply Vd, and the emitter of the transistor 501 is connected through the resistor R52 to the GND. The gate of the transistor 502 is connected to the emitter of the transistor 501, the collector of the transistor 502 is connected to the GND and the emitter of the transistor 502 is connected to the signal line 503. In this case, resistors R51 and R52 form a high voltage-side resistor voltage dividing circuit 50u.

The clip voltage of the high-voltage clip circuit 105cu is represented by [Formula 1] below. Here, Vd represents the power supply voltage, Vnpn represents the forward-direction voltage of the npn transistor 501, Vpnp represents the forward-direction voltage of the pnp transistor 502 and R1 and R2 respectively represent the resistance values of resistors R51 and R52.

$$(Vd-Vnpn) \times R2/(R1+R2) + Vpnp \quad \text{[Formula 1]}$$

On the other hand, the low-voltage clip circuit 105cd includes a transistor circuit formed with an npn transistor 505, a pnp transistor 504 and resistors R53 and R54. In this case, the gate and the collector of the transistor 504 are connected through the resistor R54 to the GND, and the emitter of the transistor 504 is connected through the resistor R53 to the power supply Vd. The gate of the transistor 505 is connected to the emitter of the transistor 504, the collector of the transistor 505 is connected to the power supply Vd and the emitter of the transistor 505 is connected to the signal line 503. In this case, resistors R53 and R54 form a low voltage-side resistor voltage dividing circuit 50d.

The clip voltage of the low-voltage clip circuit 105cd is represented by [Formula 2] below. Here, Vd represents the power supply voltage, Vnpn represents the forward-direction voltage of the npn transistor 505, Vpnp represents the forward-direction voltage of the pnp transistor 504 and R3 and R4 respectively represent the resistance values of resistors R53 and R54.

$$(Vd-Vpnp) \times R3/(R3+R4) + Vnpn \quad \text{[Formula 2]}$$

Although in the voltage clip circuit 105b described previously and shown in FIG. 4, a current is passed to the two systems of the base and the drain of the npn transistor 401 in a normal state where the clip operation is not performed, in the voltage clip circuit 105c shown in FIG. 5, a current is passed to only one system, and thus it is also advantageously possible to more reduce the consumption current.

Although the preferred embodiment including variations is described in detail above, the present invention is not limited to such an embodiment, and modifications, additions and deletions can be arbitrarily performed on the detailed configurations, the shapes, the materials, the numbers, the methods and the like without departing from the spirit of the present invention.

For example, the output resistor 104 connected in series to the signal line 113c can be replaced with another means such as a circuit which can reduce (adjust) the amount of current. Although a case where the control board 13 which outputs the control signal based on the detection signal Dd is applied to the external circuit is described, various types of signal processing circuits and the like which can utilize the detection signal Dd can be applied thereto. Although the signal line 113, the power supply line 112 connected to the power supply Vdd and the GND line 111 connected to the GND are preferably included in the wiring cable 12, another line may be included. When part of the housing member forming an engine room is used, the GND line 111 does not always need to be included in the wiring cable 12. Although a case where both of the high-voltage clip circuit 105bu . . . and the low-voltage clip circuit 105bd . . . are formed by including the transistor pair of the pnp transistor 402 . . . and the npn transistor 401 . . . is described, one of the high-voltage clip circuit 105bu . . . and the low-voltage clip circuit 105bd . . . may be formed by including the transistor pair of the pnp transistor 402 . . . and the npn transistor 401 . . . , and the other may be formed with another circuit configuration. Likewise, although a case where both of the high-voltage clip circuit 105au and the low-voltage clip circuit 105ad are formed with the diode 301 . . . is described, only one of either the high-voltage clip circuit 105au or the low-voltage clip circuit 105ad may be formed with the diode 301 . . . . Although the transistor pair is preferably formed with complimentary transistors, another type of transistor may be adopted.

INDUSTRIAL APPLICABILITY

The disconnection detection circuit according to the present invention can be widely utilized not only for a pressure detection device which detects the combustion pressure of an engine, but also for detecting a disconnection in any pressure detection device that has the same configuration.

The invention claimed is:

1. A disconnection detection circuit of a pressure detection device, with the pressure detection device including at least: a pressure detection portion having a pressure detection element which receives pressure so as to output a charge signal corresponding to the pressure; and a wiring cable which transmits a detection signal output from the pressure detection portion to an external circuit, the disconnection detection circuit detecting a disconnection of the wiring cable in the pressure detection device, wherein the disconnection detection circuit comprises:
a pull-up resistor to which the detection signal is fed and which connects a signal line connected to the wiring cable to a power supply or a pull-down resistor which connects the signal line to a GND; and
a voltage clip circuit which includes a high-voltage clip circuit which is connected between the signal line and the power supply and which clips the voltage of the signal line to a maximum specified voltage and a low-voltage clip circuit which is connected between the signal line and the GND and which clips the voltage of the signal line to a minimum specified voltage, wherein the voltage clip circuit includes an output resistor which is connected in series to the signal line on the input side of the high-voltage clip circuit and the low-voltage clip circuit.

2. The disconnection detection circuit of a pressure detection device according to claim 1,
wherein the high-voltage clip circuit includes a high voltage-side resistor voltage dividing circuit which sets the maximum specified voltage and which is connected between the power supply and the GND.

3. The disconnection detection circuit of a pressure detection device according to claim 2, wherein the high-voltage clip circuit uses a transistor pair of a pnp transistor and an npn transistor to which divided voltage obtained from the high voltage-side resistor voltage dividing circuit is fed.

4. The disconnection detection circuit of a pressure detection device according to claim 3,
wherein the transistor pair is formed with complimentary transistors.

5. The disconnection detection circuit of a pressure detection device according to claim 2,
wherein the high-voltage clip circuit uses a diode to which divided voltage obtained from the high voltage-side resistor voltage dividing circuit is fed.

6. The disconnection detection circuit of a pressure detection device according to claim 1,
wherein the low-voltage clip circuit includes a low voltage-side resistor voltage dividing circuit which sets the minimum specified voltage and is connected between the power supply and the GND.

7. The disconnection detection circuit of a pressure detection device according to claim 6,
wherein the low-voltage clip circuit uses a transistor pair of a pnp transistor and an npn transistor to which divided voltage obtained from the low voltage-side resistor voltage dividing circuit is input.

8. The disconnection detection circuit of a pressure detection device according to claim 7,
wherein the transistor pair is formed with complimentary transistors.

9. The disconnection detection circuit of a pressure detection device according to claim 6,
wherein the low-voltage clip circuit uses a diode to which divided voltage obtained from the low voltage-side resistor voltage dividing circuit is fed.

10. The disconnection detection circuit of a pressure detection device according to claim 1,
wherein the external circuit is a control board which outputs a control signal based on the detection signal.

11. The disconnection detection circuit of a pressure detection device according to claim 1,
wherein the wiring cable includes a signal line connected to the signal line, a power supply line connected to the power supply and a GND line connected to the GND.

12. The disconnection detection circuit of a pressure detection device according to claim 1,
wherein the disconnection detection circuit is applied to a pressure detection device which detects a combustion pressure of an engine mounted in an automobile.

13. The disconnection detection circuit of a pressure detection device according to claim 1,
wherein the high-voltage clip circuit includes a high voltage-side resistor voltage dividing circuit connected between the power supply and the GND for setting the maximum specified voltage, and a diode or a transistor circuit connected between the high voltage-side resistor voltage dividing circuit and the signal line, the low-voltage clip circuit includes a low voltage-side resistor voltage dividing circuit connected between the power supply and the GND for setting the minimum specified voltage, and a diode or a transistor circuit connected between the low voltage-side resistor voltage dividing circuit and the signal line.

* * * * *